US012605628B2

(12) United States Patent
Hirakawa et al.

(10) Patent No.: US 12,605,628 B2
(45) Date of Patent: Apr. 21, 2026

(54) INFORMATION PROCESSING APPARATUS AND GAME IMAGE DISPLAY METHOD

(71) Applicant: Sony Interactive Entertainment Inc., Tokyo (JP)

(72) Inventors: Yoshihiko Hirakawa, Tokyo (JP); Hisataka Suzuki, Chiba (JP); Momoko Tsuchiya, Kanagawa (JP); David Gonzalez, Kanagawa (JP); Haitao Wang, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 260 days.

(21) Appl. No.: 18/559,461

(22) PCT Filed: May 20, 2021

(86) PCT No.: PCT/JP2021/019204
§ 371 (c)(1),
(2) Date: Nov. 7, 2023

(87) PCT Pub. No.: WO2022/244199
PCT Pub. Date: Nov. 24, 2022

(65) Prior Publication Data
US 2024/0226738 A1 Jul. 11, 2024

(51) Int. Cl.
*A63F 13/53* (2014.01)
*A63F 13/537* (2014.01)

(52) U.S. Cl.
CPC ........... *A63F 13/53* (2014.09); *A63F 13/537* (2014.09); *A63F 2300/303* (2013.01); *A63F 2300/306* (2013.01)

(58) Field of Classification Search
CPC .. A63F 13/53; A63F 13/537; A63F 2300/303; A63F 2300/306
USPC ........................................................ 463/31
See application file for complete search history.

(56) References Cited

U.S. PATENT DOCUMENTS

| | | | | |
|---|---|---|---|---|
| 5,577,913 | A * | 11/1996 | Moncrief | .............. A63F 13/497 434/69 |
| 6,488,505 | B1 * | 12/2002 | Hightower | ............ A63F 13/497 434/69 |
| 7,670,220 | B2 * | 3/2010 | Chudley | ................. A63F 13/10 463/6 |
| 9,616,342 | B2 * | 4/2017 | Motokura | ............... A63F 13/77 |

(Continued)

FOREIGN PATENT DOCUMENTS

| | | |
|---|---|---|
| JP | 2000153069 A | 6/2000 |
| JP | 2003320164 A | 11/2003 |

OTHER PUBLICATIONS

International Search Report for corresponding PCT Application No. PCT/JP2021/019204, 4 pages, dated Jul. 13, 2023.

*Primary Examiner* — Allen Chan
(74) *Attorney, Agent, or Firm* — Kilpatrick Townsend & Stockton LLP

(57) ABSTRACT

A game executing section executes a game program on the basis of an operation made by a user, to generate a game image including a game character. A recording section records moving image data obtained by extracting a game character image from a past game video. A display processing section superimposes the game character image included in the moving image data, on the game image generated by the game executing section.

6 Claims, 11 Drawing Sheets

(56)　　　　　　　References Cited

U.S. PATENT DOCUMENTS

2011/0212776 A1 *　9/2011　Kishimoto ........ A63F 13/2145
　　　　　　　　　　　　　　　　　　　463/31
2014/0256447 A1　　9/2014　Woodman \* cited by examiner

1

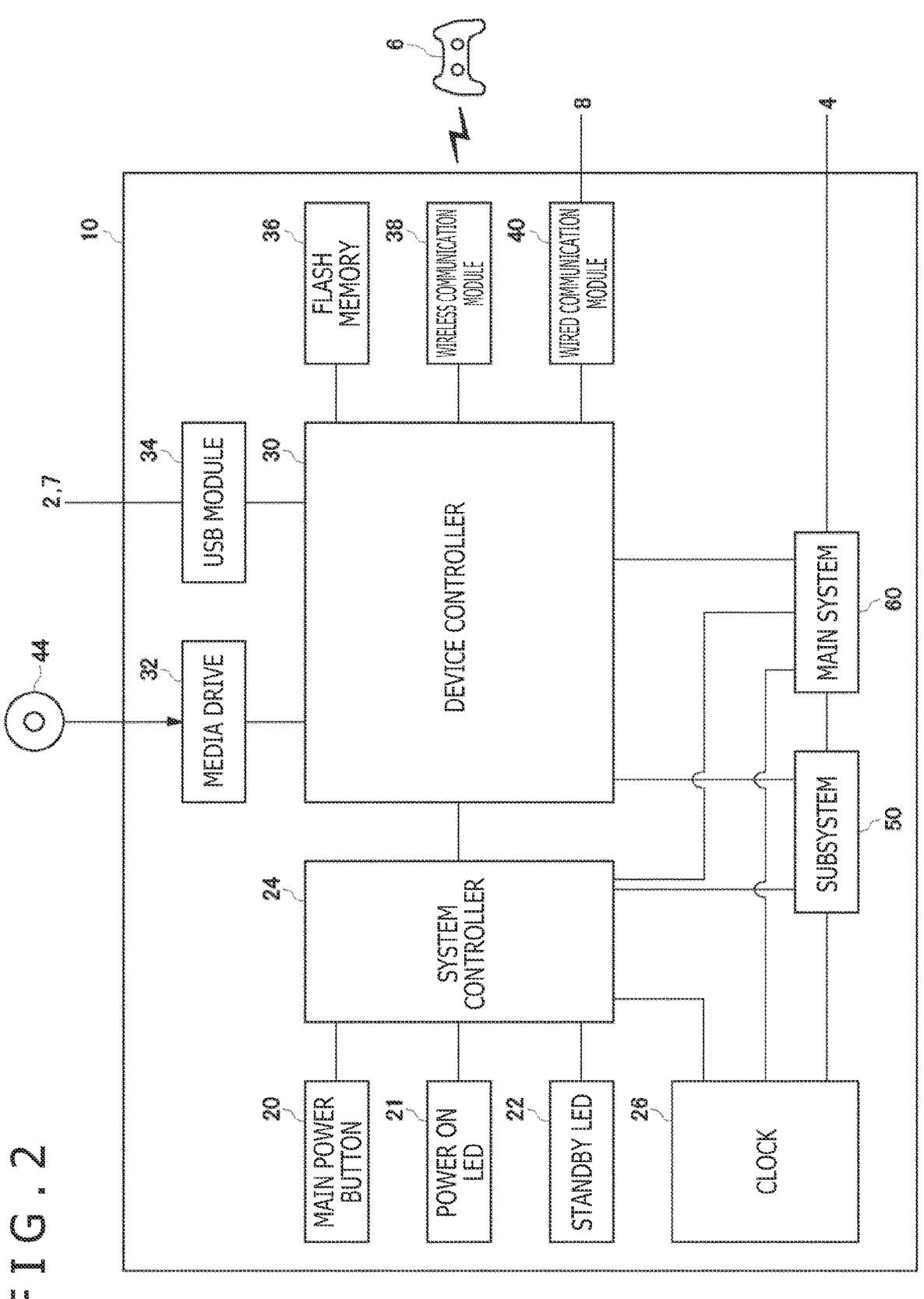
F I G . 2

F I G . 4
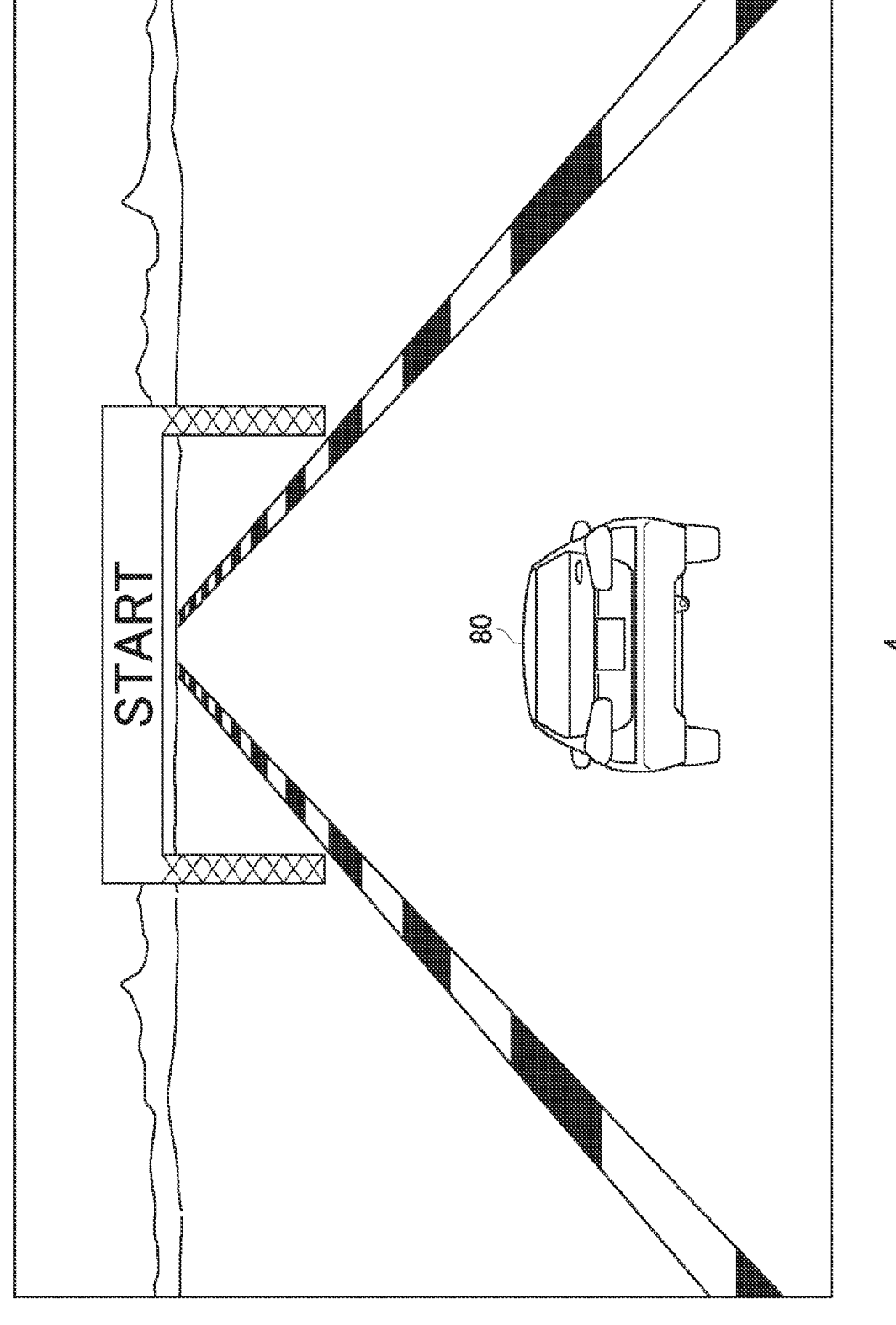
START
80
4

START

ABC Car Race

Select your ghost player

World Record Holder
01:10:35
Smith

No.1 in Friends
01:15:12
Tatsuya

Personal Best Record
01:16:50
You

70b

80

4

F I G . 7
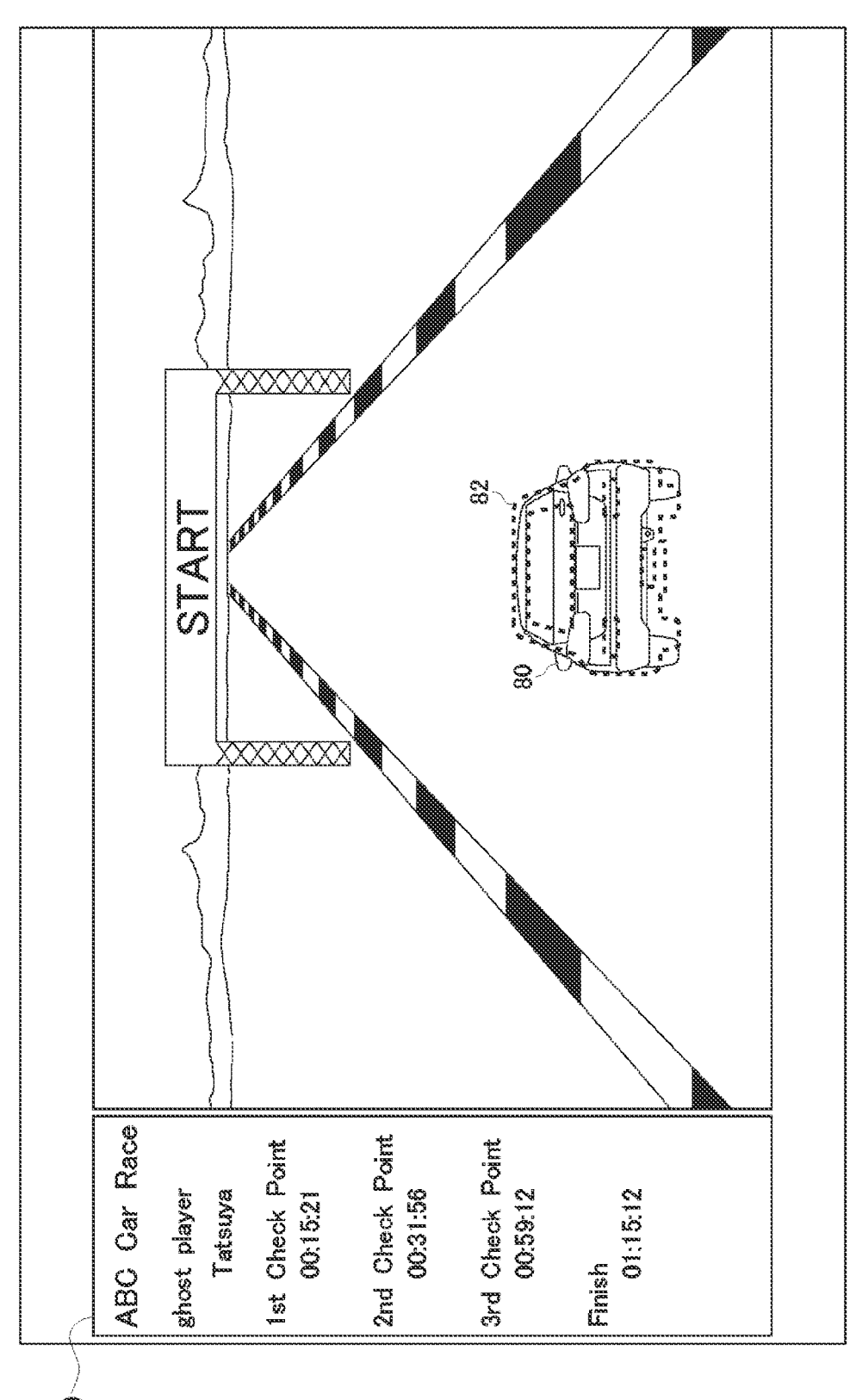

F I G . 8
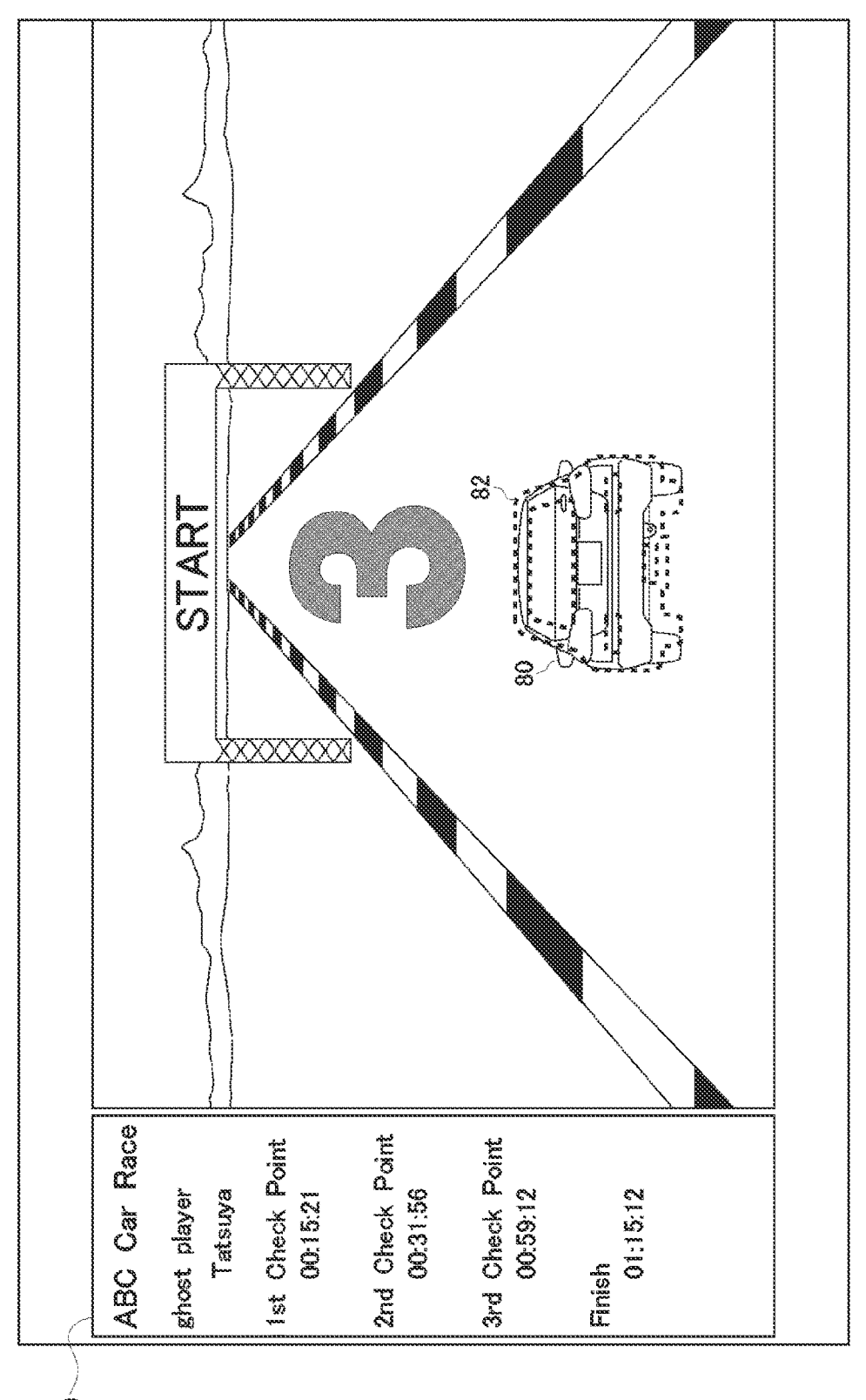

F I G . 9
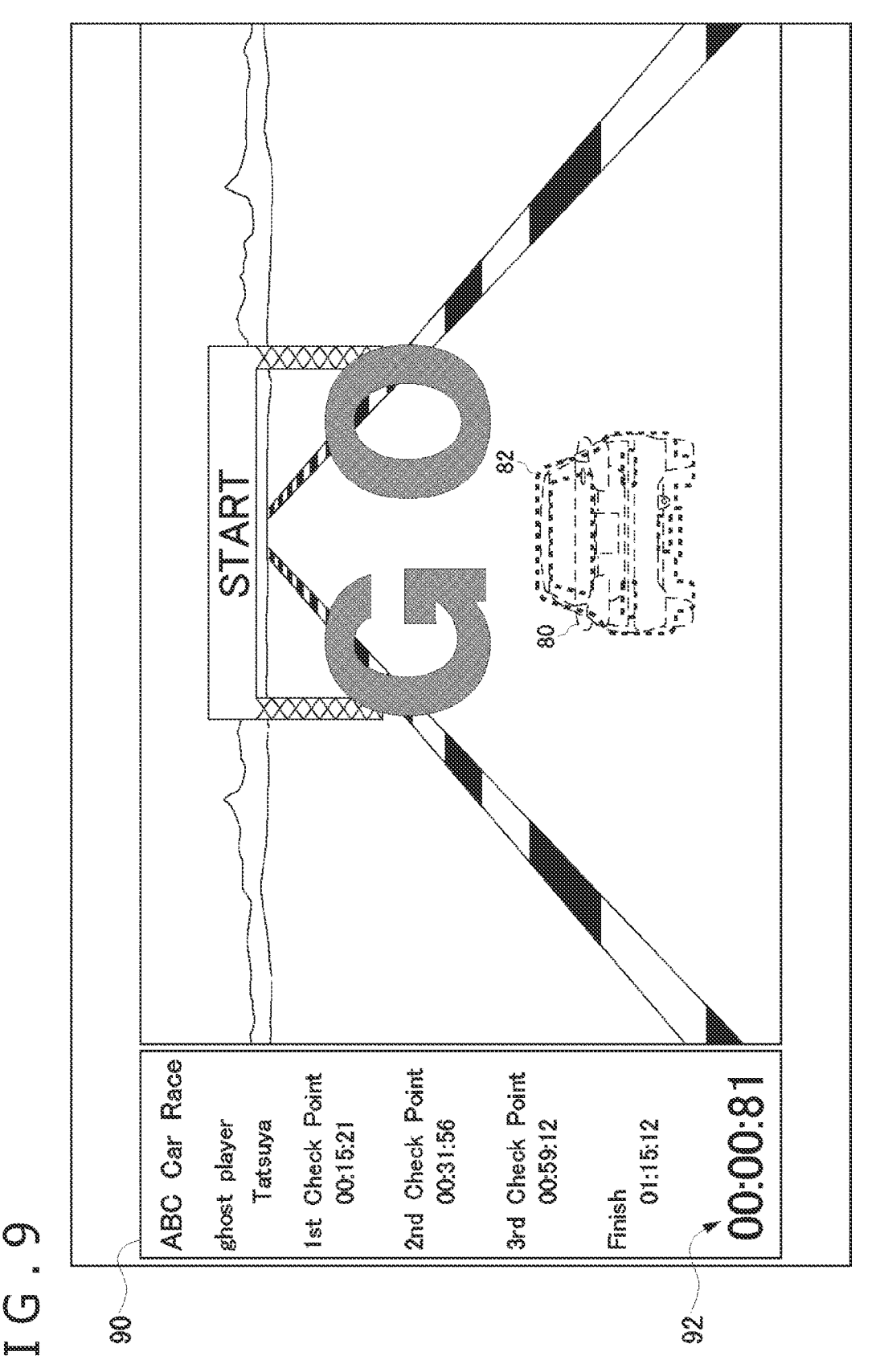

FIG. 11

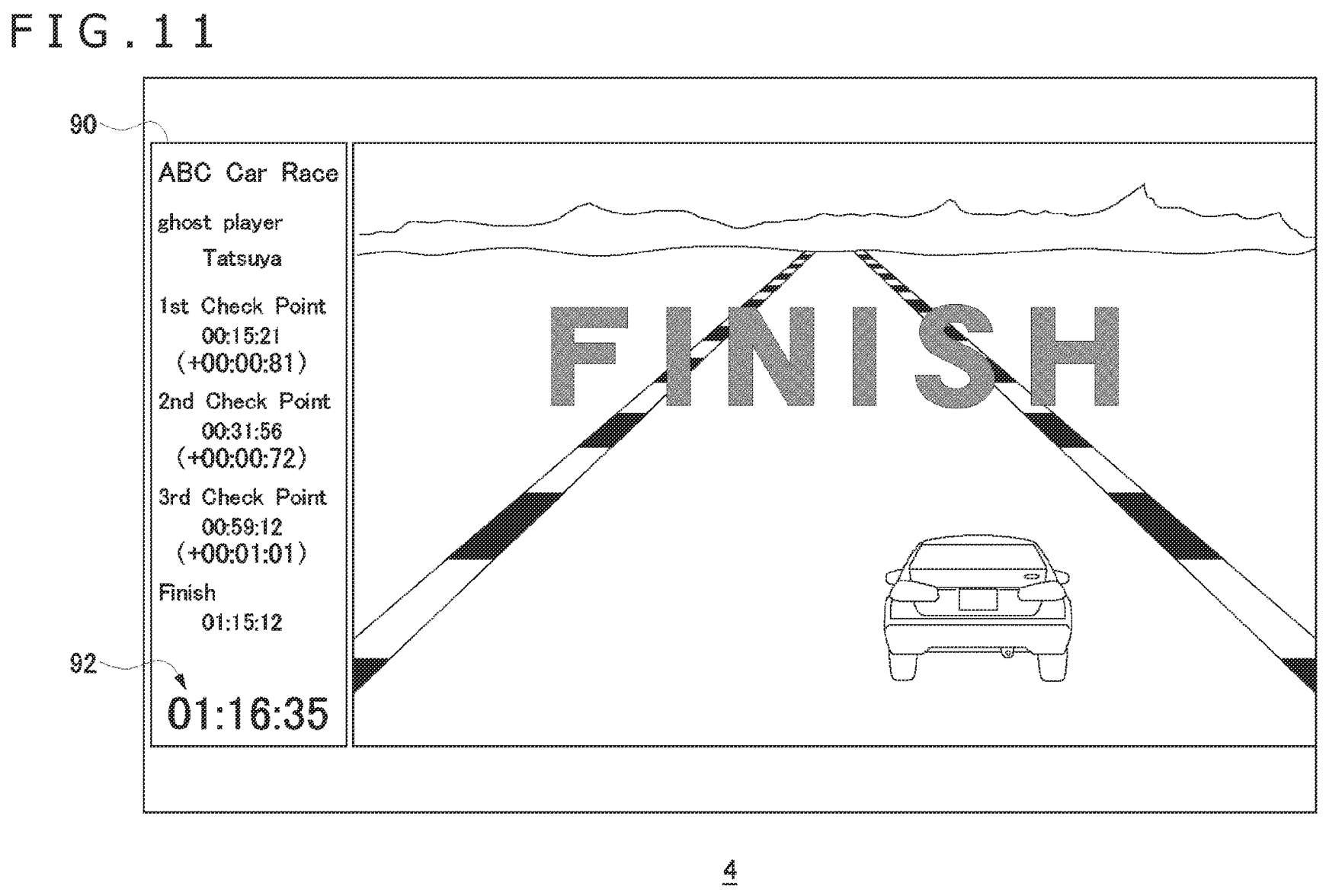

ABC Car Race ghost player    Tatsuya

1st Check Point
    00:15:21
    (+00:00:81)
2nd Check Point
    00:31:56
    (+00:00:72)
3rd Check Point
    00:59:12
    (+00:01:01)
Finish
    01:15:12

01:16:35

90

92

4

INFORMATION PROCESSING APPARATUS AND GAME IMAGE DISPLAY METHOD

TECHNICAL FIELD

The present disclosure relates to a technology for superimposing an image of a game character operated in the past on an image of a game being played by a user.

BACKGROUND ART

There have been distributed games in which users can compete with ghost characters based on control information of previously operated game characters. Such a game processes control information of a game character being operated by a user, synchronously with control information of a game character operated in the past, so that the user can enjoy competition with the ghost character. The control information of the past game character may be, for example, control information obtained when the game character was played by the user or a friend, or may be control information obtained when a world ranker played.

SUMMARY

Technical Problem

However, if the game does not support the processing of the control information of the ghost character, the user cannot enjoy the competition with the ghost character. Therefore, it is preferable to provide a mechanism that allows users to compete with ghost characters in a simulated manner even in games that do not support ghost character control.

The present disclosure has been made in view of such a problem, and an object thereof is to provide a technology for superimposing an image of a game character operated in the past on a game image.

Solution to Problem

In order to solve the above problem, an information processing apparatus according to one aspect of the present disclosure includes a game executing section that executes a game program on the basis of an operation made by a user, to generate a game image including a game character, a recording section that records moving image data obtained by extracting a game character image from a past game video, and a display processing section that superimposes, on the game image generated by the game executing section, the game character image included in the moving image data.

A method for displaying a game image according to another aspect of the present disclosure includes a step of executing a game program on the basis of an operation made by a user, to generate a game image including a game character, a step of recording moving image data obtained by extracting a game character image from a past game video, and a step of superimposing, on the game image, the game character image included in the moving image data.

It should be noted that any combination of the above-mentioned components, and any conversion of the expression of the present disclosure between methods, apparatuses, systems, computer programs, recording media on which computer programs are readably recorded, data structures, etc., are also effective as aspects of the present disclosure.

BRIEF DESCRIPTION OF DRAWINGS

FIG. 2 is a diagram illustrating a hardware configuration of an information processing apparatus.

FIG. 4 is a diagram illustrating an example of a game image.

FIG. 7 is a diagram illustrating an example of a screen where a user's game character is to play against a ghost character.

FIG. 8 is a diagram illustrating a scene in which the countdown to the start of a race has started.

FIG. 9 is a diagram illustrating a scene in which the race starts.

FIG. 11 is a diagram illustrating a scene in which the user's game character reaches the goal.

DESCRIPTION OF EMBODIMENT

Figure 1:
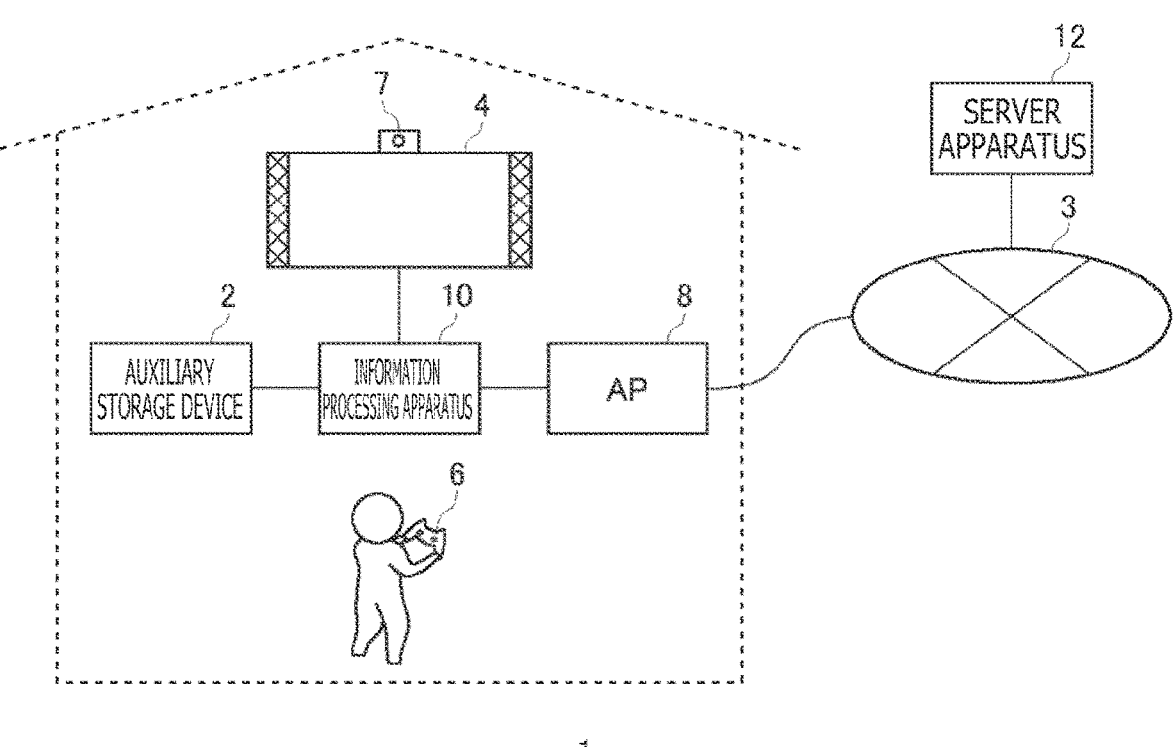
FIG. 1 is a diagram illustrating an information processing system according to an embodiment.

FIG. 1 illustrates an information processing system 1 according to an embodiment of the present disclosure. The information processing system 1 includes an information processing apparatus 10 and a server apparatus 12. An access point (AP) 8 functions as a wireless access point and a router. The information processing apparatus 10 connects to a network 3 such as the Internet or a LAN (Local Area Network) via the AP 8 and is communicably connected to the server apparatus 12.

The information processing apparatus 10 is connected in a wired or wireless manner to an input apparatus 6 operated by a user, and the input apparatus 6 transmits information regarding an operation made by the user to the information processing apparatus 10. The information processing apparatus 10 applies the information regarding the operation made by the user, to system software and game processing, and outputs processing results from an output apparatus 4. The information processing apparatus 10 according to the embodiment may be a terminal apparatus such as a game apparatus or a personal computer that executes a game, and the input apparatus 6 may be such an apparatus as a game controller that supplies the information regarding the operation made by the user, to the information processing apparatus 10.

The input apparatus 6 includes a plurality of input units such as a plurality of push-type operation buttons, analog sticks capable of inputting analog amounts, and rotary buttons. A camera 7 as an imaging apparatus is provided near the output apparatus 4 and captures an image of the space around the output apparatus 4. Although, in the example illustrated in FIG. 1, the camera 7 is attached to the top of the output apparatus 4, the camera 7 may be arranged on the side of the output apparatus 4. In any case, the camera 7 is placed at such a position that an image of the user playing the game in front of the output apparatus 4 can be captured. The camera 7 may be a stereo camera.

An auxiliary storage device 2 is a large-capacity storage device such as an HDD (Hard Disk Drive) or an SSD (Solid State Drive), and may be a built-in storage device or may be an external storage device connected to the information processing apparatus 10 via a USB (Universal Serial Bus) or the like. The output apparatus 4 may be a television having a display for outputting images and a speaker for outputting audio, or may be a head-mounted display. The output apparatus 4 may be connected to the information processing apparatus 10 with a wired cable or wirelessly.

The server apparatus 12 provides network services to users of the information processing system 1. The server apparatus 12 manages network accounts that identify users, and the users use their network accounts to sign in to the network services provided by the server apparatus 12. By signing in to the network service from the information processing apparatus 10, the user can register, in the server apparatus 12, save data of the game and trophies which are virtual awards obtained during the game play.

In the information processing system 1 according to the embodiment, the server apparatus 12 has a function of generating moving image data by extracting game character images from past game videos, and providing the data to the information processing apparatus 10. The information processing apparatus 10 superimposes and displays the game character image included in the moving image data, on the image of the game that the user is playing, so that the user can enjoy a simulated play against a ghost character. The server apparatus 12 may provide the information processing apparatus 10 with data associated with the moving image data, such as data indicating passage time at one or more checkpoints, together with the moving image data.

FIG. 2 illustrates the hardware configuration of the information processing apparatus 10. The information processing apparatus 10 includes a main power button 20, a power ON LED (Light Emitting Diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory that is a main storage device, a memory controller, a GPU (Graphics Processing Unit), and the like. The GPU is mainly used for arithmetic processing of a game program. The main CPU has functions of activating the system software and executing the game program installed in the auxiliary storage device 2 under the environment provided by the system software. The subsystem 50 includes a sub-CPU, a memory that is a main storage device, a memory controller, and the like, but does not include a GPU.

While the main CPU has the function of executing the game program installed in the auxiliary storage device 2, the sub-CPU does not have such a function. However, the sub-CPU has functions of accessing the auxiliary storage device 2 and transmitting and receiving data to and from the server apparatus 12. The sub-CPU only has such limited processing functions, and can thus operate with power consumption lower than that of the main CPU. These functions of the sub-CPU are executed when the main CPU is in the standby state.

The main power button 20 is an input unit to which the user inputs an operation. The main power button 20 is provided on a front surface of a housing of the information processing apparatus 10 and operated to turn on or off the power supply to the main system 60 of the information processing apparatus 10. The power ON LED 21 lights up when the main power button 20 is turned on, and the standby LED 22 lights up when the main power button 20 is turned off. The system controller 24 detects depression of the main power button 20 by the user.

The clock 26 is a real-time clock. The clock 26 generates current date and time information and supplies the information to the system controller 24, the subsystem 50, and the main system 60.

The device controller 30 is configured as an LSI (Large-Scale Integrated Circuit) that exchanges information between devices like a south bridge. As illustrated in the figure, devices such as the system controller 24, the media drive 32, the USB module 34, the flash memory 36, the wireless communication module 38, the wired communication module 40, the subsystem 50, and the main system 60 are connected to the device controller 30. The device controller 30 absorbs differences in electrical characteristics and data transfer speeds of the respective devices, and controls the timing of data transfer.

The media drive 32 is a drive device that drives when being mounted with a ROM (Read-Only Memory) medium 44 on which application software of a game or the like and license information are recorded, and that reads out programs, data, and the like from the ROM medium 44. The ROM medium 44 is a read-only recording medium such as an optical disk, a magneto-optical disk, or a Blu-ray disk.

The USB module 34 is a module configured to be connected to an external device with a USB cable. The USB module 34 may be connected to the auxiliary storage device 2 and the camera 7 with USB cables. The flash memory 36 is an auxiliary storage device that constitutes an internal storage. The wireless communication module 38 wirelessly communicates with the input apparatus 6, for example, by using a communication protocol such as the Bluetooth (registered trademark) protocol or the IEEE (Institute of Electrical and Electronics Engineers) 802.11 protocol. The wired communication module 40 performs wired communication with an external device and connects to the network 3 via the AP 8, for example.

Figure 3:
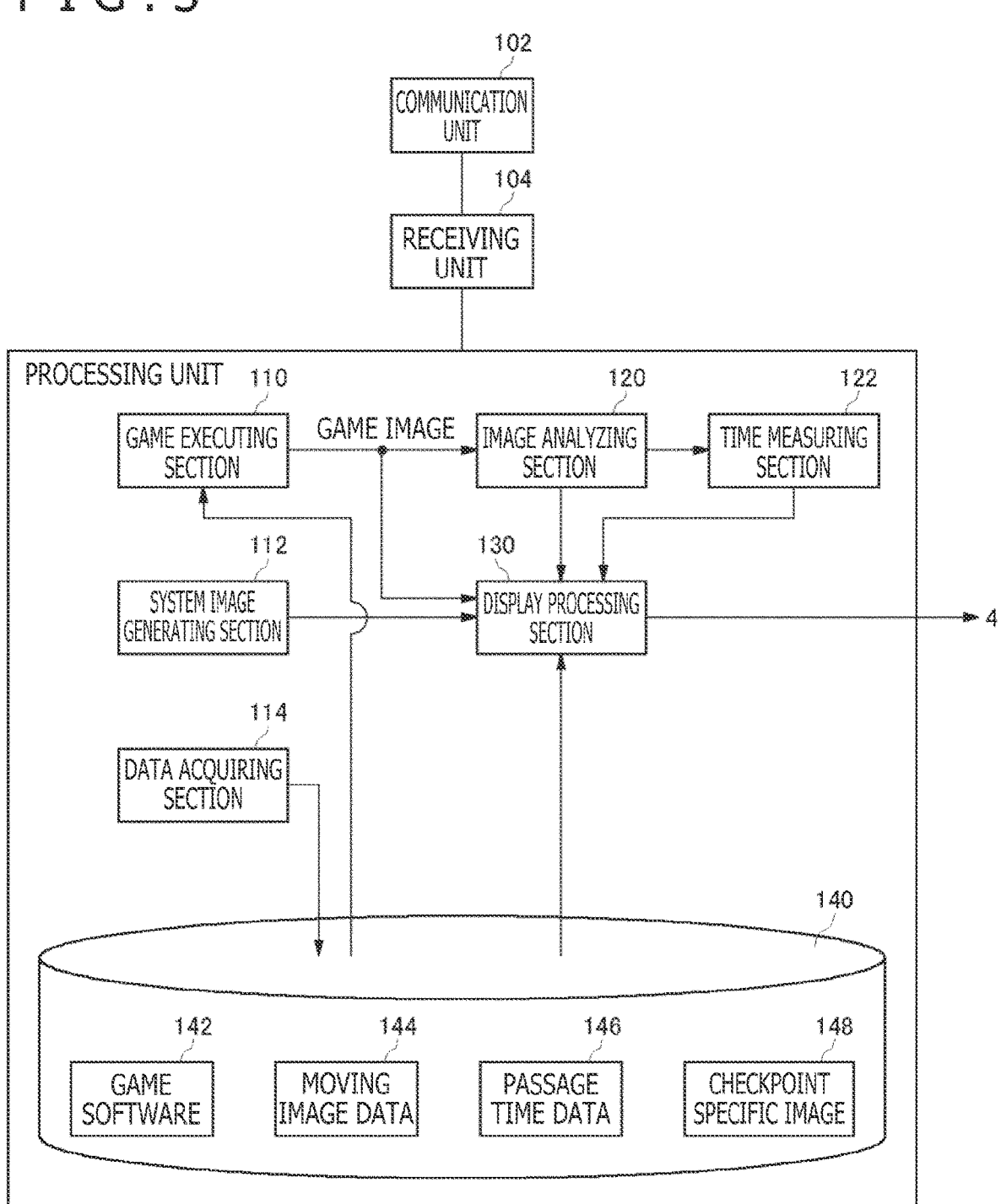
FIG. 3 is a diagram illustrating functional blocks of the information processing apparatus.

FIG. 3 illustrates functional blocks of the information processing apparatus 10. The information processing apparatus 10 includes a processing unit 100, a communication unit 102, and a receiving unit 104. The processing unit 100 includes a game executing section 110, a system image generating section 112, a data acquiring section 114, an image analyzing section 120, a time measuring section 122, a display processing section 130, and a recording section 140.

Respective elements described in FIG. 3 as functional blocks that perform various types of processing of the information processing apparatus 10 can be constituted by circuit blocks, memories, and other LSIs in terms of hardware, and achieved by game software, system software, etc., loaded into the memory in terms of software. Therefore, those skilled in the art will understand that these functional blocks can be implemented in various forms by hardware only, software only, or a combination thereof and are not limited to any one of them.

The recording section 140 is configured by the auxiliary storage device 2 or the flash memory 36 and records game software 142. The game software 142 includes at least a game program, and image data and audio data that constitute the game. The game program performs arithmetic processing to move a game character in a virtual space. In the embodiment, the game character means a game object to be operated by a user, and includes not only a virtual person and animal but also a vehicle, for example.

The game executing section 110 executes a game program on the basis of an operation made by a user on the input apparatus 6. The game executing section 110 has a GPU that executes rendering processing and the like, and generates a game image including a game character operated by the user. Although the game executing section 110 also generates game sounds, the details of the processing of the game sounds will be omitted in the following description.

FIG. 4 illustrates an example of a game image displayed on the output apparatus 4. When the user selects the game titled "ABC Car Race" on a menu screen in which a plurality of icon images of games are arranged, the game executing section 110 executes the game software 142 of the game titled "ABC Car Race" and generates a game image including a game character 80. The game executing section 110 supplies the generated game image to the display processing section 130, and the display processing section 130 displays the game image on the output apparatus 4.

The game software 142 does not have a function of moving a ghost character in the game on the basis of the control information of the game character operated in the past. Thus, in the information processing apparatus 10 according to the embodiment, the system software superimposes the ghost character on the game image such that the user can play against the ghost character in a simulated manner.

When a predetermined button (for example, home button) of the input apparatus 6 is operated, the receiving unit 104 receives the operation as an operation of displaying a system image, and the system image generating section 112 generates such a system image that can be operated by the user. The system image generating section 112 is implemented by system software. The system image generating section 112 supplies the generated system image to the display processing section 130, and the display processing section 130 superimposes the system image on the game image and displays the image on the output apparatus 4.

Figure 5:
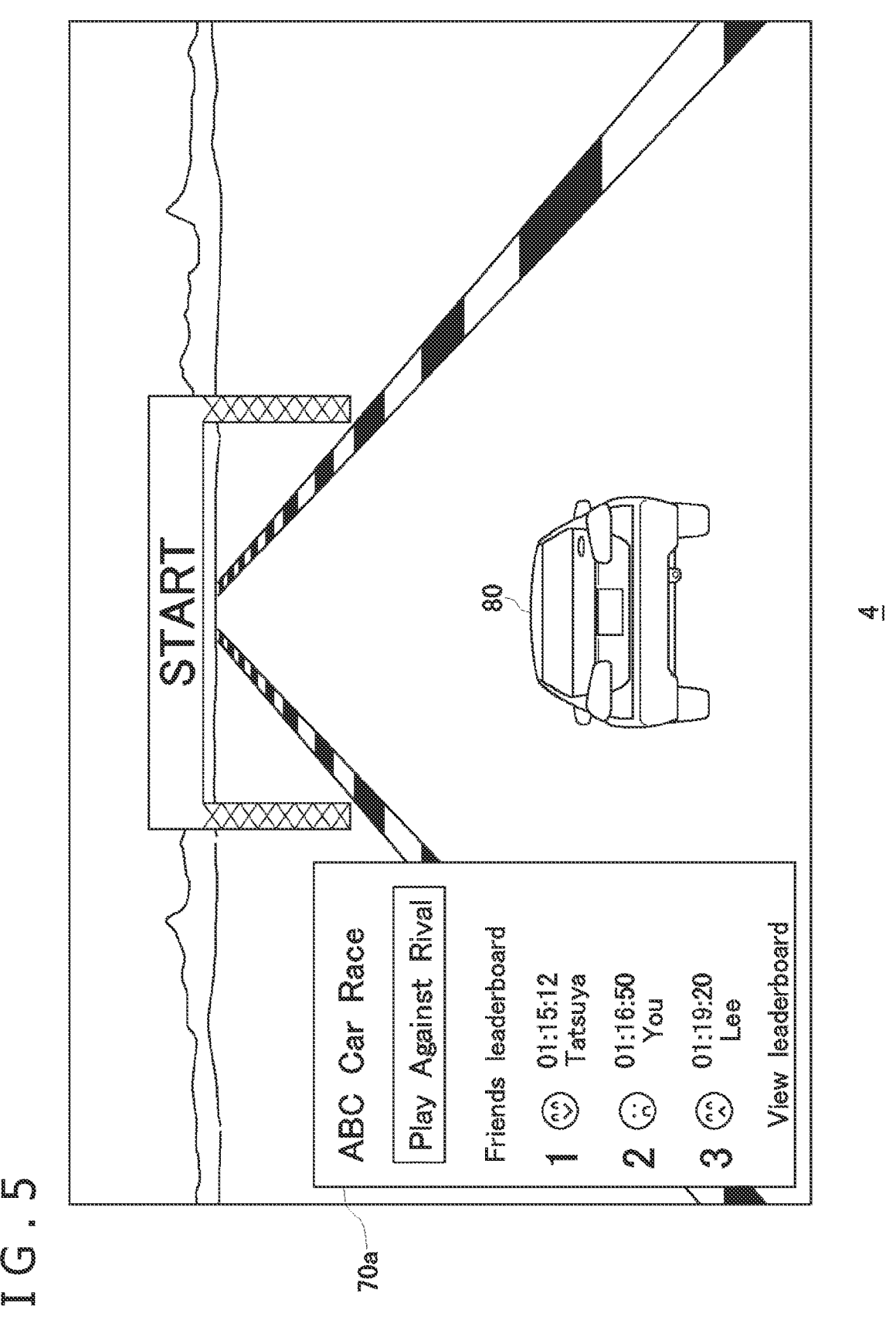
FIG. 5 is a diagram illustrating an example of a system image superimposed on the game image.

FIG. 5 illustrates an example of a system image superimposed on the game image. The system image generating section 112 generates a system image 70a including a card-shaped GUI element, and the display processing section 130 superimposes the system image 70a on the game image and displays the image on the output apparatus 4. The system image 70a includes information regarding the game titled "ABC Car Race." In this example, the top three friends having the fastest time records are displayed with their fastest time records, and the user's own fastest time is ranked second. The system image generating section 112 acquires these pieces of information from the server apparatus 12. When the user selects the item "Play Against Rival" in the system image 70a, the receiving unit 104 receives the operation of selecting the item, and the system image generating section 112 generates a system image for selecting a ghost player.

Figure 6:
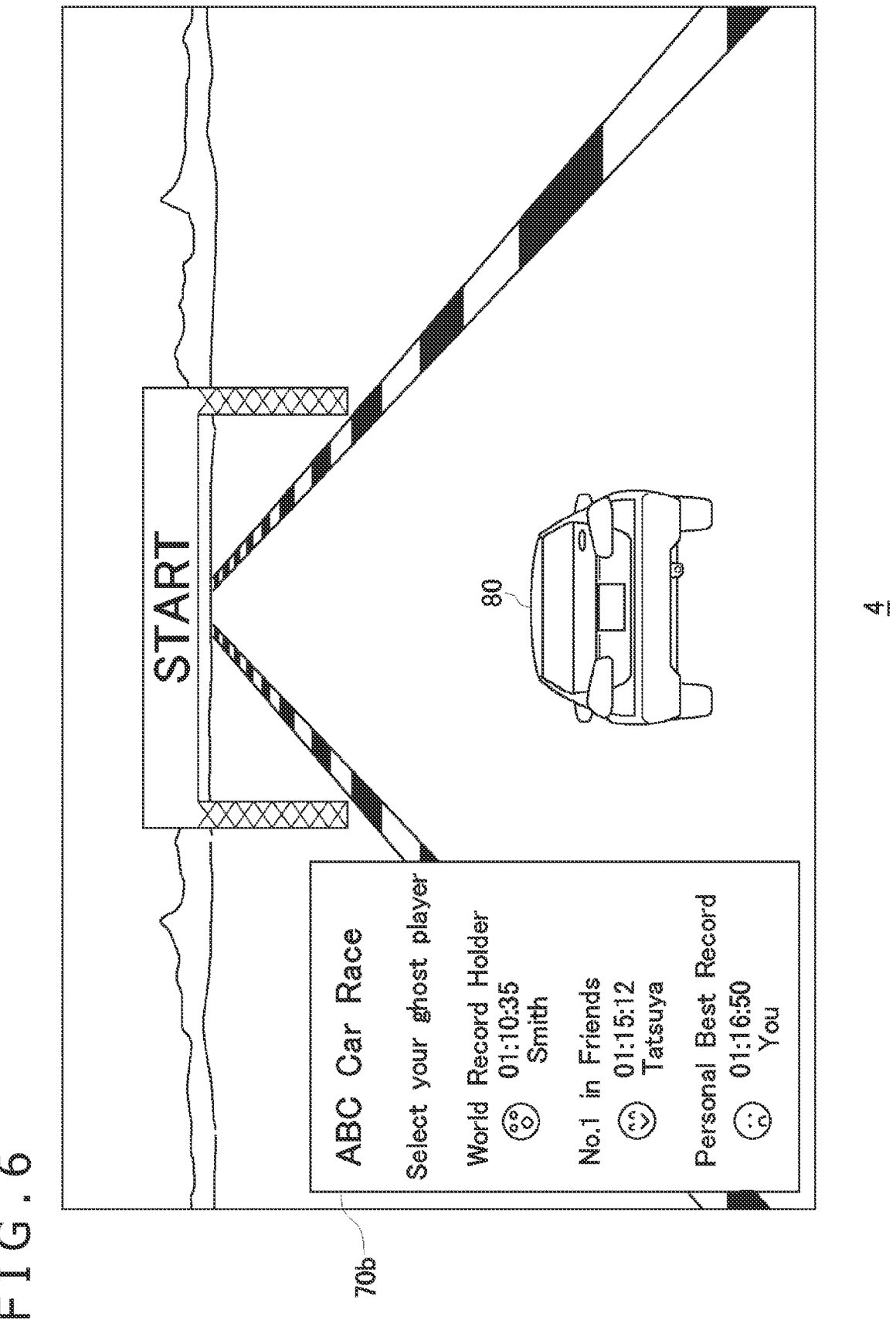
FIG. 6 is a diagram illustrating another example of the system image superimposed on the game image.

FIG. 6 illustrates another example of the system image superimposed on the game image. The system image generating section 112 generates a system image 70b for selecting a ghost player, and the display processing section 130 superimposes the system image 70b on the game image and displays the image on the output apparatus 4. The system image 70b includes ghost player options as opponents that the user is to play against. In the example illustrated in FIG. 6, "Smith" who is the world record holder, "Tatsuya" who has the fastest time among the friends, and the user himself or herself are displayed as the ghost player options. In the embodiment, the user selects "Tatsuya."

When the receiving unit 104 receives the operation of selecting "Tatsuya," the data acquiring section 114 accesses the server apparatus 12 and acquires moving image data that was obtained when "Tatsuya" recorded the fastest time "01:15:12" in the ABC car race, passage time data associated with the moving image data, and a checkpoint specific image. The data acquiring section 114 records the acquired data, i.e., moving image data 144, passage time data 146, and a checkpoint specific image 148, in the recording section 140.

In the information processing system 1, the server apparatus 12 is provided with past game videos from a plurality of users. The server apparatus 12 may function as a distribution server that distributes the game videos provided by a plurality of users. The user can access the server apparatus 12 and enjoy the game videos posted by various users.

The server apparatus 12 according to the embodiment has a function of processing game videos provided by users and generating moving image data for ghost play, in addition to the function as a distribution server. To be specific, the server apparatus 12 generates moving image data by extracting game character images from moving images of past games, and registers the generated moving image data in a database. In processing of the game video of the ABC car race, the server apparatus 12 generates moving image data by extracting only a car, which is a game character, from the game video (that is, by deleting images other than the image of the car). At this time, the server apparatus 12 may process the game character to make it translucent. The start point of the moving image data may be a timing at which the race starts, and the end point thereof may be a timing at which the game character reaches the goal, or any other timing as described later.

Further, the server apparatus 12 analyzes the game video to obtain passage time at which the game character passed one or more checkpoints (elapsed time from the start to the checkpoints). Here, the checkpoints are defined at specific scenes in the game video. In the ABC car race, the checkpoints may be defined as scenes in which predetermined trees, predetermined signboards, or the like placed on the side of the course are displayed, and the like. The definition of checkpoints may be done manually by a curator. A specific image for detecting checkpoints (checkpoint specific image) is associated with the game and registered in the database.

The server apparatus 12 performs image analysis on the game video to obtain passage time at defined checkpoints. In the embodiment, a first checkpoint, a second checkpoint, and a third checkpoint are defined, and the server apparatus 12 performs image analysis on the game video of the ABC car race to detect checkpoint specific images, and then obtain the passage time at each checkpoint. In the case where the checkpoint is set to a "tree" arranged on the side of the course, the server apparatus 12 sequentially analyzes respective frames of the game video, and obtains the passage time at the checkpoint on the basis of the number of the frame in which the "tree" to which the checkpoint is set is first detected. The server apparatus 12 registers passage time data indicating the passage time at each checkpoint, in the database in association with the moving image data obtained by extracting the translucent game character image.

The server apparatus 12 receives, from the information processing apparatus 10, a request to acquire moving image data and passage time data associated with the moving image data. In the above example, the server apparatus 12 accepts a request to acquire moving image data and passage time data that were obtained when "Tatsuya" recorded the fastest time "01:15:12." The server apparatus 12 reads out the relevant moving image data and passage time data and checkpoint specific images of the ABC car race from the database, and transmits these to the information processing apparatus 10.

In this way, the data acquiring section 114 acquires the moving image data 144 and the passage time data 146 that were obtained when "Tatsuya" recorded the fastest time "01:15:12." and the checkpoint specific image 148 from the server apparatus 12, and records these in the recording section 140.

FIG. 7 illustrates an example of a screen where the game character is to play against a ghost character. The display processing section 130 reads out the moving image data 144 from the recording section 140 and superimposes the game character image included in the moving image data 144, on the game image generated by the game executing section 110. FIG. 7 illustrates how a ghost character 82 is superimposed on the game image. The ghost character 82 is a game character image included in the start frame of the moving image data 144 (that is, the frame at the timing of the start of the race), and at this point, the reproduction of the moving image data 144 is not started. In the moving image data 144, the ghost character 82 is translucent, so that the user can easily recognize that the ghost character 82 is a game character as the opponent.

The display processing section 130 provides, on the left side of the screen, a passage time display area 90 that indicates the passage time at which the ghost player, i.e., "Tatsuya" in this example, passed the checkpoints. By providing the passage time display area 90, the display processing section 130 reduces the area for displaying the game image. Note that the passage time display area 90 may be displayed by being superimposed on the game image. In such a case, the display area of the game image does not need to be reduced.

The display processing section 130 reads out the passage time data 146 from the recording section 140 and displays the passage time at the checkpoints in the passage time display area 90. In the embodiment, records of the passage time at which "Tatsuya" passed the first checkpoint, the second checkpoint, and the third checkpoint, and the finish time are displayed in the passage time display area 90.

FIG. 8 illustrates a scene in which the countdown before the race start has started. In the ABC car race, a countdown of "3," "2," "1," and "GO" is displayed before the start of the race. The image analyzing section 120 performs image analysis on the game image generated by the game executing section 110 and detects a start image to determine a timing at which to start reproducing the moving image data 144.

The image analyzing section 120 analyzes the frame image generated by the game executing section 110 and detects a countdown display "3." The countdown display "3" indicates that the race will start in three seconds, and is used as the start image to determine the timing at which to start reproducing the moving image data 144. When detecting "3" in the game image, the image analyzing section 120 notifies the display processing section 130 that "3" has been detected. The display processing section 130 determines the timing at which to start reproducing the moving image data 144, on the basis of the timing at which the image analyzing section 120 detects the start image. In the case where the start image has the countdown display "3," the timing at which to start reproducing the moving image data 144 is three seconds after the image analyzing section 120 detects "3."

Note that, in the embodiment, the countdown display "3" is used as the start image, but a countdown display "2" or "1" may be set as the start image. The display processing section 130 determines the timing at which to start reproducing the moving image data 144, and starts reproducing the moving image data 144 at the determined timing.

Although, in the embodiment, the server apparatus 12 generates the moving image data 144 that starts at the timing at which the race starts, the server apparatus 12 may generate the moving image data 144 that starts at the timing at which the countdown display "3" is displayed, for example. In the case where the start point of the moving image data 144 is set to the timing at which the countdown display "3" is displayed, the display processing section 130 may determine the timing at which the image analyzing section 120 detects the countdown display "3," as the timing at which to start the reproduction of the moving image data 144, and may start the reproduction of the moving image data 144 immediately after notified by the image analyzing section 120 that "3" is detected.

FIG. 9 illustrates a scene in which the race starts. When the race has started, the user uses the input apparatus 6 to operate the game character 80. At the same time, the display processing section 130 starts reproducing the moving image data 144 and superimposes the translucent ghost character 82 on the game image generated by the game executing section 110. By seeing the translucent ghost character 82, the user can enjoy a simulated racing with "Tatsuya." A time display area 92 indicating the elapsed time from the start of the race is displayed in the bottom of the passage time display area 90.

Figure 10:
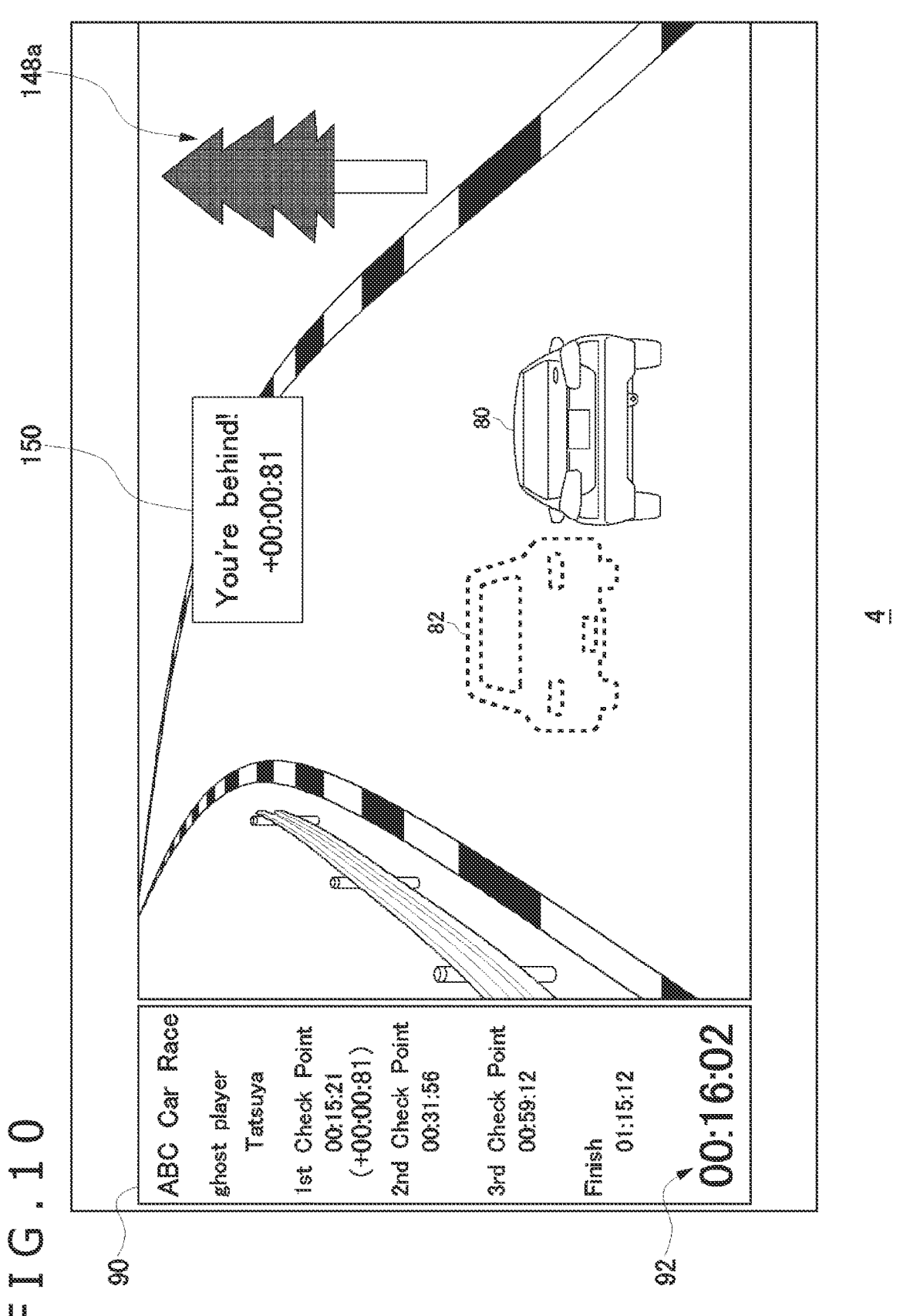
FIG. 10 is a diagram illustrating a scene in which the user's game character reaches a checkpoint.

FIG. 10 illustrates a scene in which the user's game character 80 reaches the first checkpoint. The image analyzing section 120 analyzes the frame image generated by the game executing section 110 and checks whether or not the checkpoint specific image 148 is included in the frame image. Since the first checkpoint, the second checkpoint, and the third checkpoint appear in this order on the race course, the image analyzing section 120 checks whether or not an image for identifying the first checkpoint (first checkpoint specific image 148a) is included in the frame image. In this example, the first checkpoint specific image 148a is an image of a "tree" arranged on the right side of the race course.

When analyzing the game image and confirming that the first checkpoint specific image 148a is included, the image analyzing section 120 detects that the game character 80 operated by the user has passed the first checkpoint. When passage of the first checkpoint is detected, the time measuring section 122 obtains the time at which the game character 80 passed the first checkpoint. In the example illustrated in FIG. 10, the time measuring section 122 measures the time and detects that the game character 80 passed the first checkpoint at "00:16:02."

The time measuring section 122 refers to the passage time data 146 recorded in the recording section 140, to calculate the time difference between the time at which the game character 80 operated by the user passed the first checkpoint and the passage time at the first checkpoint included in the passage time data 146, which is associated with the moving image data 144. Here, since the passage time at the first checkpoint included in the passage time data 146 is "00:15:21," the time measuring section 122 calculates the time difference at the first checkpoint as "+00:00:81." Incidentally, the sign "+" in the time difference expresses that the game character 80 is slower than the ghost character 82, and the sign "−" in the time difference expresses that the game character 80 is faster than the ghost character 82. The time measuring section 122 provides the calculated time difference to the display processing section 130, and the display processing section 130 superimposes information regarding the calculated time difference on the game image. By seeing time difference information 150, the user can check whether the user is ahead of or behind the ghost character 82. Note that the time measuring section 122 may display the time difference at the first checkpoint in the passage time display area 90.

Regarding the subsequent second checkpoint and third checkpoint, the image analyzing section 120 performs image analysis on the game image to detect a second checkpoint specific image and a third checkpoint image, and the time measuring section 122 calculates the time difference at each checkpoint. The display processing section 130 displays the time difference information 150 superimposed on the game image, each time the game character 80 reaches a checkpoint, thereby allowing the user to check whether the user is ahead of or behind the ghost character 82 at each checkpoint.

FIG. 11 illustrates a scene in which the user's game character 80 reaches the goal. When analyzing the frame image generated by the game executing section 110 and detecting that the game image includes "FINISH." the image analyzing section 120 determines the end of the race, and notifies the time measuring section 122 and display processing section 130 of the end of the race. The time measuring section 122 stops counting-up of the timer to obtain the finish time and notifies the display processing section 130 of the finish time. When receiving the notification of the end of the race, the display processing section 130 ends the reproduction of the moving image data 144 and ends the superimposition display of the ghost character 82. Further, the display processing section 130 displays the finish time in the time display area 92 upon receiving the notification of the finish time. Note that the finish time may be provided from the game executing section 110 since the game obtains the finish time.

The present disclosure has been described above on the basis of the embodiment. The embodiment is illustrative, and those skilled in the art will understand that various modifications can be made to combinations of the respective components and processing processes, and such modifications are also within the scope of the present disclosure.

In the embodiment, the race start timing is determined by detecting the countdown display "3," and the race end timing is determined by detecting "FINISH." The countdown display "3" and the image of "FINISH" may be included in the checkpoint specific image 148, and the image analyzing section 120 may refer to the checkpoint specific image 148 to perform image analysis.

Also, in the progress of the game, the game character 80 may not be able to reach the goal due to sliding off the course or crashing, for example, in some cases. In such a case, an image to be displayed when the goal cannot be reached may be registered as the checkpoint specific image 148 in advance, and when the image analyzing section 120 detects the image, the display processing section 130 may forcibly terminate reproduction of the moving image data 144.

INDUSTRIAL APPLICABILITY

The present disclosure can be used in the technical field in which an image of a game character operated in the past is superimposed on an image of a game being played by a user.

REFERENCE SIGNS LIST

1: Information processing system
10: Information processing apparatus
12: Server apparatus
100: Processing unit
102: Communication unit
104: Receiving unit
110: Game executing section
112: System image generating section
114: Data acquiring section
120: Image analyzing section
122: Time measuring section
130: Display processing section
140: Recording section
142: Game software
144: Moving image data
146: Passage time data
148: Checkpoint specific image

The invention claimed is:

1. An information processing apparatus comprising:
a game executing section configured for executing a game program on a basis of an operation made by a user, the game executing section being further configured for generating a game image including a game character;
a recording section configured for recording moving image data obtained by extracting a game character image from a past game video;
a display processing section configured for superimposing, on the game image generated by the game executing section, the game character image included in the moving image data; and
an image analyzing section configured for analyzing the game image and detecting a start image to determine a timing at which to start reproducing the moving image data,
wherein the display processing section is further configured for determining a timing at which to start reproducing the moving image data, from a timing at which the image analyzing section detects the start image, and starts reproducing the moving image data at the timing as determined.

2. The information processing apparatus according to claim 1, wherein the image analyzing section analyzes the game image and detects that the game character operated by the user has passed a predetermined checkpoint.

3. The information processing apparatus according to claim 2, further comprising: a time measuring section configured for acquiring a time at which the game character operated by the user passed the predetermined checkpoint.

4. The information processing apparatus according to claim 3, wherein
the recording section is further configured for recording a passage time at the predetermined checkpoint, the passage time being associated with the moving image data,
the time measuring section is further configured for calculating a time difference between the time at which the game character operated by the user passed the predetermined checkpoint and the passage time at the predetermined checkpoint that is associated with the moving image data, and
the display processing section is further configured to superimpose, on the game image, information indicating the calculated time difference.

5. A method for displaying a game image, comprising:

executing a game program on a basis of an operation made by a user;

generating a game image including a game character;

recording moving image data obtained by extracting a game character image from a past game video;

superimposing, on the game image, the game character image included in the moving image data;

analyzing the game image to detect a start image; and reproducing the moving image data upon detection of the start image.

6. A non-transitory, computer readable storage medium containing a computer program, which when executed by a computer, causes the computer to perform a method for displaying a game image by carrying out actions, comprising:

executing a game program on a basis of an operation made by a user generating a game image including a game character;

recording moving image data obtained by extracting a game character image from a past game video;

superimposing, on the game image, the game character image included in the moving image data;

analyzing the game image to detect a start image; and reproducing the moving image data upon detection of the start image.

* * * * *